United States Patent

Kim et al.

[11] Patent Number: 5,901,321
[45] Date of Patent: May 4, 1999

[54] APPARATUS AND METHOD FOR INTERRUPT PROCESSING IN A CODE DIVISION MULTIPLE ACCESS SWITCHING APPARATUS

[75] Inventors: June Man Kim, Kyoungki-do; Seung Hwan Lee, Seoul, both of Rep. of Korea

[73] Assignee: Hyundai Electronics Industries Co., Ltd., Kyoungki-Do, Rep. of Korea

[21] Appl. No.: 08/958,734

[22] Filed: Oct. 27, 1997

Related U.S. Application Data

[63] Continuation of application No. 08/467,730, Jun. 6, 1995, abandoned.

[30] Foreign Application Priority Data

Jun. 30, 1994 [KR] Rep. of Korea ............ 94-15648

[51] Int. Cl.⁶ .................................................. G06F 9/46
[52] U.S. Cl. .............................................. 395/737; 370/479
[58] Field of Search .................................. 395/733–742; 370/414, 416, 418, 320, 335, 342, 441, 479

[56] References Cited

U.S. PATENT DOCUMENTS 4,761,732  8/1988  Eldumiati et al. ...................... 395/736
5,101,497  3/1992  Culley et al. ........................... 395/734
5,197,083  3/1993  Gandini et al. ......................... 375/225
5,471,620  11/1995  Shimizu et al. ....................... 395/738

OTHER PUBLICATIONS

IBM, "Intelligent Input/Output Interrupt Processing", IBM Technical Disclosure Bulletin, vol. 17, No. 7, pp. 1915–1916, Dec. 1974.

Primary Examiner—Ayaz R. Sheikh
Assistant Examiner—Sumati Lefkowitz
Attorney, Agent, or Firm—Merchant, Gould, Smith, Edell, Welter & Schmidt

[57] ABSTRACT

An apparatus and method for interrupt processing are provided, in which an interrupt is latched in a synchronous system in order to process the interrupt of a code division multiple access switching apparatus. An interrupt of higher priority order is processed by arbitrarily designating the priority order of the interrupt, and then an interrupt of lower priority order is processed in order, regardless of the priority order, thereby being used in a control system of the code division multiple access switching apparatus to which an interrupt having no priority order is applied.

9 Claims, 4 Drawing Sheets

APPARATUS AND METHOD FOR INTERRUPT PROCESSING IN A CODE DIVISION MULTIPLE ACCESS SWITCHING APPARATUS

This is a Continuation of application Ser. No. 08/467,730, filed Jun. 6, 1995, now abandoned.

BACKGROUND OF THE INVENTION

1. Field of the Invention

The present invention relates to an apparatus and method for interrupt processing, and more particularly to an apparatus and method for interrupt processing in which an interrupt is latched in a synchronous system in order to process the interrupt of a code division multiple access, (CDMA) switching apparatus and an interrupt of higher priority order is processed by arbitrarily designating the priority order of the interrupt, and then, an interrupt of lower priority order is processed in order regardless of the priority order.

2. Description of Related Art

As shown in FIG. 1, a conventional interrupt processing apparatus comprises an interrupt input portion 1 for inputting a plurality of interrupts, an interrupt controller 2 for selectively outputting an interrupt of higher priority order from a plurality of interrupts input concurrently from interrupt input portion 1, and an interrupt processor 3 for processing the interrupt selected at interrupt controller 2.

In the conventional interrupt processing apparatus of this configuration, when a new interrupt is input to interrupt input portion 1, the priority order of the newly input interrupt is compared with that of the interrupt currently in action at interrupt controller 2. If the priority order of the newly input interrupt is lower than that of the interrupt in action, the currently acting interrupt continues. In the reverse case, the interrupt in action is halted and the new interrupt of higher priority order is processed at interrupt processor 3.

However, the conventional interrupt processing apparatus of this configuration operates only to interrupt requests of a higher level, so that the apparatus cannot be applied to a control system in a code division multiple access, (CDMA) switching apparatus to which an interrupt having no priority order is applied.

An interrupt processing apparatus is disclosed in U.S. Pat. No. 5,197,083. The technology disclosed therein relates to an art in which a higher priority order interrupt input halts a currently operating interrupt and then the interrupt of higher priority order is carried out. Accordingly, the technology cannot be applied to a code division multiple access apparatus to which an interrupt having no priority order is applied.

SUMMARY OF THE INVENTION

To solve the above problems, it is an object of the present invention to provide the apparatus and method for interrupt processing, in which an interrupt is latched in a synchronous system in order to process the interrupt of a code division multiple access, (CDMA) switching apparatus and an interrupt of higher priority order is processed by arbitrarily designating the priority order of the interrupt, and then an interrupt of lower priority order is processed regardless of the priority order.

Accordingly, to achieve the above object, there is provided an interrupt processing apparatus comprising an interrupt input portion for inputting a plurality of interrupts; an interrupt latching portion for latching and outputting a plurality of the interrupts concurrently input from the interrupt input portion on a data bus; an interrupt controller for establishing an interrupt data base by loading an interrupt request channel from the data bus according to a priority order and performance capability determined after reading the interrupt data from the interrupt latching portion, for outputting the interrupt in the determined priority order after storing the interrupt data on the data base, for reading the data and concurrently outputting a reset signal to interrupt latching portion; and an interrupt processor for the proceeding the interrupt output from interrupt controller.

To achieve the above object, there is provided an interrupt processing method comprising the steps of concurrently receiving a plurality of interrupts, latching the interrupts; inputting the interrupts into an interrupt data base and clearing the latched interrupts, and latching a new interrupt; and performing interrupts according to the determined priority order.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
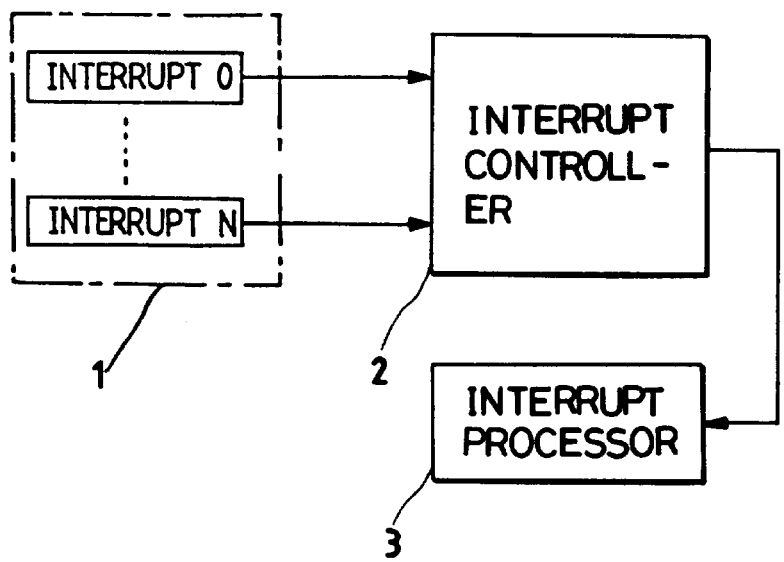
FIG. 1 is a view illustrating the configuration of the conventional interrupt processing apparatus.
Figure 2:
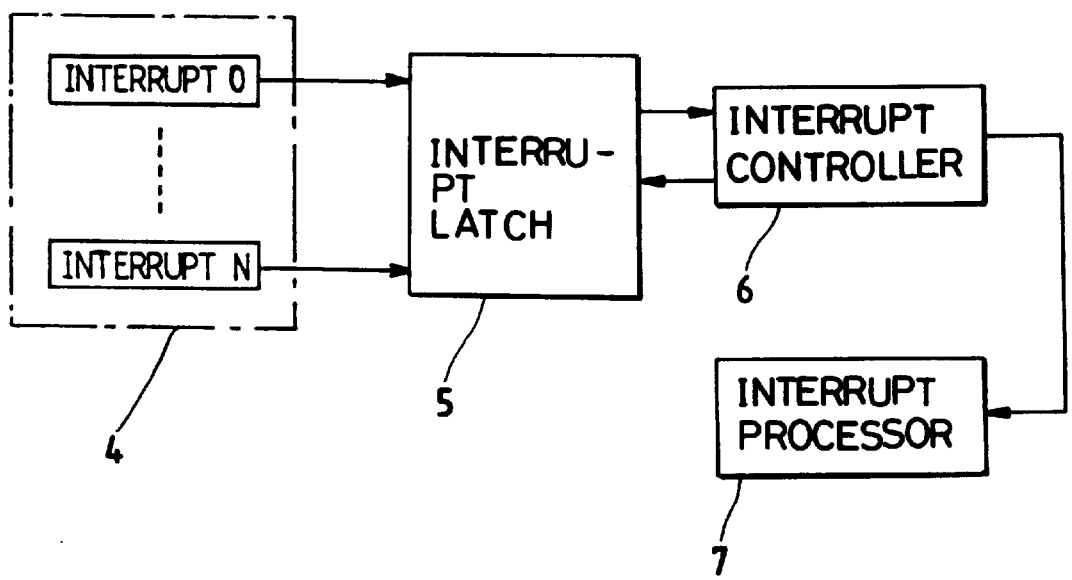
FIG. 2 is a view illustrating the configuration of the interrupt processing apparatus according to the present invention.

Referring to FIG. 2, the interrupt processing apparatus of the present invention includes an interrupt input portion 4 for inputting a plurality of interrupts and an interrupt latch 5 for latching and outputting a plurality of interrupts concurrently input from the interrupt input portion 4. An interrupt controller 6 an interrupt data base by loading an interrupt request channel from the data bus according to the predetermined priority order and performance capability after reading the interrupt data from interrupt latch 5. The interrupt controller 6 outputs the interrupt in order after storing the read data on the data base. The interrupt controller also reads the data and concurrently outputs an elimination signal to the interrupt latch 5. An interrupt processor 7 performs an interrupt by receiving the interrupt output from the interrupt controller 6.

In the interrupt processing apparatus of the present invention of the above configuration, a plurality of interrupts are input to the interrupt latch 5 through the interrupt input portion 4 and are latched on the relevant channels at the interrupt latch 5 to be output to the interrupt controller 6. The interrupt controller 6 reads the interrupt data, establishes an interrupt data base by loading the request channel of the interrupt from the data bus according to the predetermined level order and performance capability, and processes the interrupts in order. When the data bus is read to confirm the interrupts temporarily stored at the interrupt latch, all the channels are cleared at the same time so as to be capable of receiving the next interrupt. After the read data is stored in the data base, the interrupts are processed in order at the interrupt controller 6. An interrupt, which is input while the data stored in the data base is being processed, is temporarily stored at the interrupt latch 5, which, being maintained in a ready state, does not respond to the interrupt until the interrupt controller 6 allows it to respond. Thus, although the interrupt is not performed directly, the interrupt data does not disappear since the data is temporarily stored at the latch.

Figure 3:
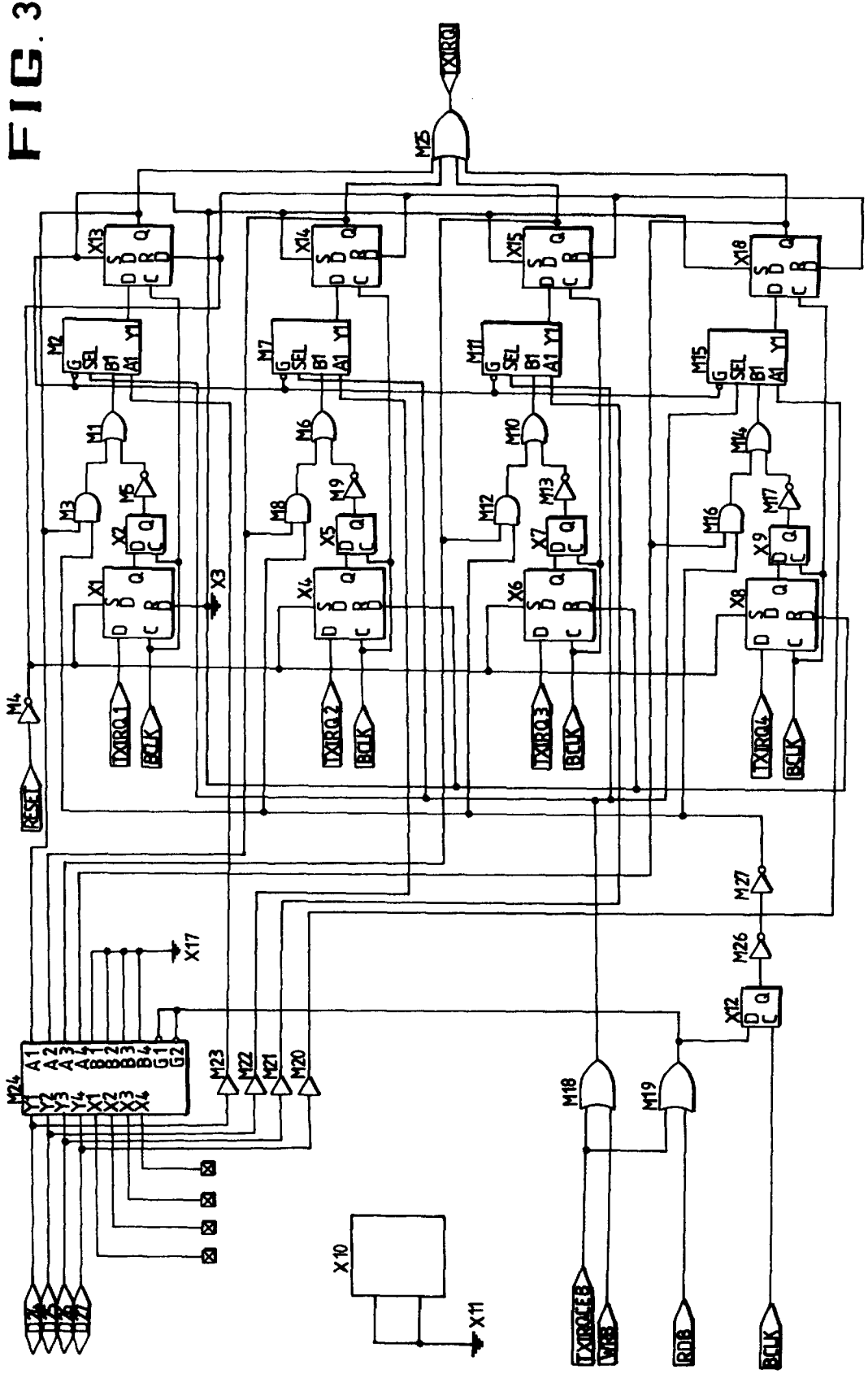
FIG. 3 is a circuit diagram illustrating a practical embodiment of the synchronous interrupt latch and automatic clearing portion of FIG. 2.

In FIG. 3, a circuit diagram of a practical embodiment of the interrupt latch 5 in the interrupt processing apparatus is shown. Four interrupts are input through a data bus (D24–D27). The embodiment has a bidirectional buffer M24, buffers M20 to M 23, OR gates M1, M6, M10, M14, M18, M19 and M25, D-flip-flop latches X1, X2, X4 to X9 and X12 to X16, inverters M5, M9, M13, M17, M26 and M27, AND gates M3, M8, M12 and M16, and multiplexers M2, M7, M11 and M15. It is preferable to use an octal buffer line driver with a 3 state output 74×244 for the bidirectional buffer M24.

Figure 4:
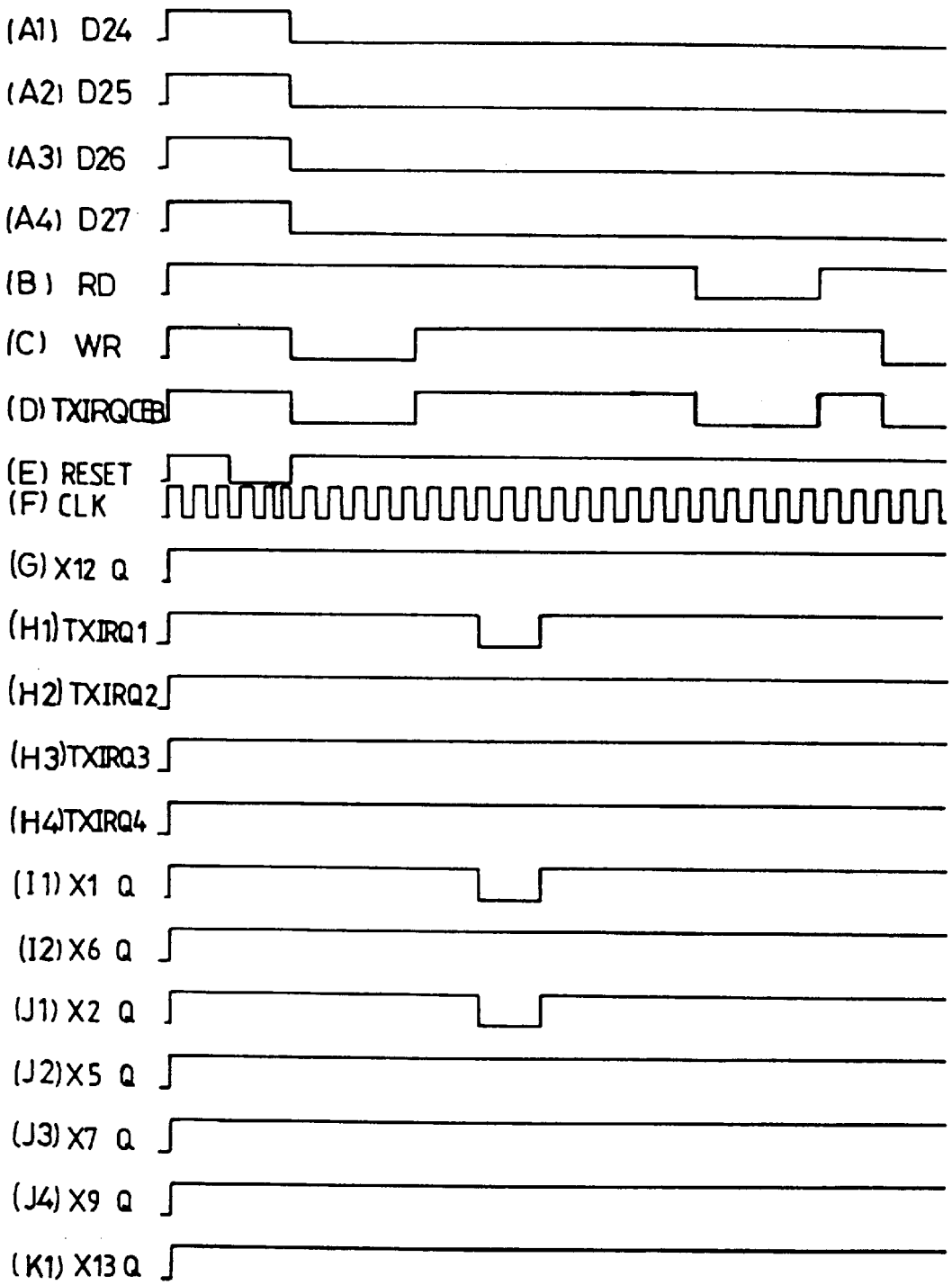
FIG. 4 is a view showing the timing of the signals in the circuit of FIG. 3.
Figure 4:
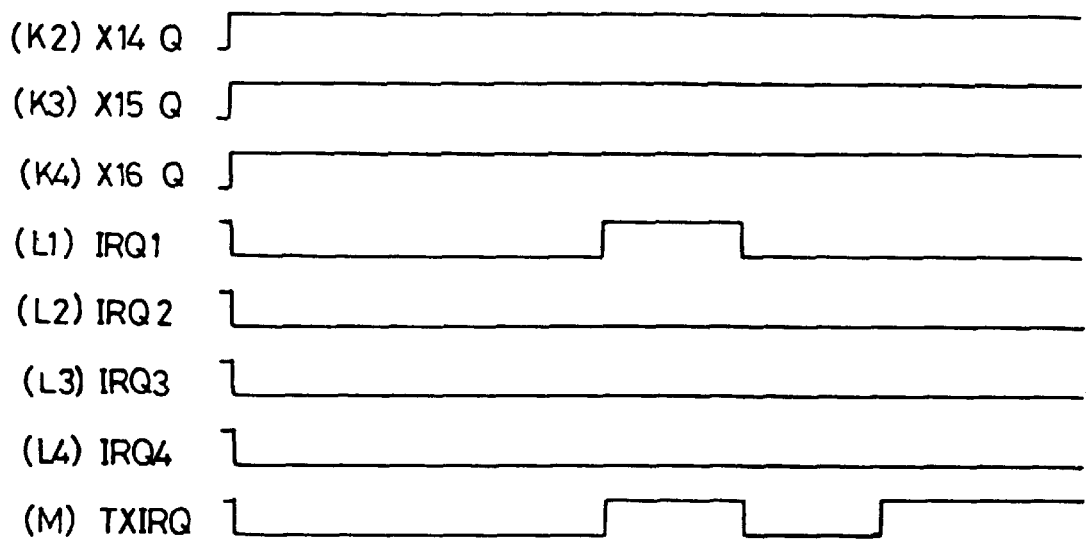

Referring to FIG. 4, which shows the timing between each signal, the operation of the interrupt latch 5 is described, as follows.

Interrupts, such as A1 to A4 of FIG. 4 input through the data bus, are input to the output port Q of D-flip-flops X13 to X16 and to the input port A1 of AND gates M3, M8, M12 and M16 and multiplexers M2, M7, M11 and M15, via bidirectional buffer M24 and buffers M20 to M23, respectively on the data bus. The signals TXIRQCEB is ANDed read signal (RD) and write signal (WRB) in FIG. 3, shown in FIG. 4 marked as (B) to (D), are input to the port (SEL) of multiplexers M2, M7, M11 and M15 through OR gate M18. The signal TXIRQCEB and the read signal (RDB) in FIG. 3, are input to the data port D of D-flip-flop X12 and the ports G1 and G2 of bidirectional buffer M24 through OR gate M19. A reset signal (RESET) as (E) of FIG. 4 is input to the data port D of D-flip-flops X1, X4, X6 and X8 and the port (RD) of D-flip-flops X13, X14, X15 and X16 via inverter M4. D-flip-flop X12 receives a clock (CLK) (BCLK in FIG. 3) as (F) of the FIG. 4 via clock port C and an output signal of OR gate M19 via data port D, and outputs to the AND gates M3, M8, M12 and M16 as (G) of FIG. 4.

D-flip-flops X1, X4, X6 and X8 receive the signals (H1) to (H4), shown as TXIRQ 1–4in FIG. 3 through data port D, respectively, and simultaneously, receive the clock (CLK) signal (F) of FIG. 4 through clock port C so as to output the signals, such as (I1) and (I2) of FIG. 4, respectively. D-flip-flops X2, X5, X7 and X9 receive the output signal of D-flip-flops X1, X4, X6 and X8 through data port D, and simultaneously, receive the clock (CLK) signal (F) of FIG. 4 through clock port C so as to output the signal, (J1) to (J4) of FIG. 4, respectively. These signals are output to OR gates M1, M6, M10 and M14 via inverters M5, M9, M13 and M14 respectively and enter the respective OR gates M1, M6, M10 and M14 with the output signal of respective AND gates M3, M8, M12 and M14. The outputs of OR gates M1, M6, M10 and M14 are fed as inputs to input port B1 of multiplexers M2, M7, M11 and M15, respectively. D-flip-flops X13 to X16 receive the output signals (K1) to (K4) from multiplexers M2, M7, M11 and M15 respectively. These signals constitute the signals (L1) to (L4) being synthesized with the output signal of bidirectional buffer M24. The signals (L1) to (L4) are input to OR gate M25, and the output signal is TXIRQ shown as the (M).

As described above, the interrupt processing apparatus and method according to the present invention, can be used in a control system of code division multiple connection switching apparatus to which an interrupt having no priority order is applied.

What is claimed is:

1. A code division multiple access (CDMA) based interrupt processing apparatus for processing interrupts without associated priority levels, comprising:

an interrupt input portion for inputting interrupt data on a data bus;

an interrupt latching portion for latching and outputting the interrupt data concurrently input from said interrupt input portion, the latching portion including a multiplexer switchable between latching an interrupt signal and transmitting an interrupt having no associated priority level;

an interrupt controller for establishing an interrupt data base by loading the interrupt data from the data bus according to a predetermined priority order after reading the interrupt data from said interrupt latching portion, for outputting the interrupt data in the predetermined priority order after storing the interrupt data on the data base, for outputting an interrupt received with no associated priority level, and for outputting a reset signal to said interrupt latching portion concurrently with reading the interrupt data; and an interrupt processor for processing the interrupt output from said interrupt controller.

2. An apparatus according to claim 1, wherein the interrupt latching portion includes an output connected as an input to a D-flip flop, an output from the flip flop being connected to an AND gate, an output from the AND gate being connected to an OR gate, an interrupt data signal being connected to the OR gate as another input, and an output from the OR gate connected as an input to the multiplexer.

3. A method according to claim 1, wherein the latching portion includes an OR gate having an input to receive an interrupt signal, an output of the OR gate connected to an input to a multiplexer, an output from the multiplexer connected as an input to a D-flip flop, an output from the D-flip flop being connected as an input to an AND gate, and an output from the AND gate being connected as a second input to the OR gate.

4. A method for processing interrupts having no associated priority in a code division multiple access (CDMA) environment, the method comprising the steps of:

concurrently receiving a plurality of interrupts;

latching said plurality of interrupts in a latching portion switchable to transmit an interrupt signal having no associated priority level and a signal having priority;

inputting said plurality of interrupts into an interrupt data base;

determining a priority order for said plurality of interrupts;

clearing the latched plurality of interrupts from the latching portion;

performing interrupts according to the determined priority order; and performing interrupts received without any associated priority level.

5. A code division multiple access (CDMA) based interrupt processing apparatus for processing interrupts without associated priority levels, comprising:

an interrupt input portion for inputting a plurality of interrupts;

an interrupt latching portion for latching and outputting the plurality of interrupts concurrently input from said interrupt input portion, and for outputting interrupts received having no associated priority level;

an interrupt controller, connected to the interrupt latching portion to receive a signal indicating that the interrupt latching portion has received one or more interrupts, and to establish an interrupt data base by loading an interrupt from the latching portion according to a priority order determined after reading the interrupts from said interrupt latching portion, to output interrupts in the determined priority order, to output a reset signal to said interrupt latching portion concurrently with reading the interrupt data and to load and output interrupts received having no associated priority level; and an interrupt processor for processing the interrupts output from said interrupt controller.

6. An apparatus according to claim 5, wherein the latching portion includes a latching loop having an OR gate connected to receive an interrupt signal, an output of the OR gate connected to an input to a multiplexer, and output from the multiplexer connected to an input to a D-flip flop, and output from the D-flip flop connected to an input to an AND gate and an output from the AND gate connected as an input to the OR gate.

7. An apparatus according to claim 6, wherein the latching portion includes a plurality of latching loops, and the outputs from the D-flip flops of each latching loop are connected as inputs to an output OR gate.

8. A method for processing interrupts having no associated priority in a code division multiple access (CDMA) environment, the method comprising the steps of:

receiving one or more interrupts;

latching at least one of said one or more interrupts in a latching portion when two or more interrupts are received concurrently, where the latching portion includes a latching loop to receive each interrupt, the latching loop having an OR gate connected to receive an interrupt signal, an output of the OR gate connected to an input to a multiplexer, and output from the multiplexer connected to an input to a D-flip flop, and output from the D-flip flop connected to an input to an AND gate and an output from the AND gate connected as an input to the OR gate;

indicating to a processing portion that one or more interrupts have been received in the latching portion;

inputting said one or more interrupts into an interrupt data base;

determining a priority order for the latched interrupts using an interrupt controller;

clearing the latched interrupts from the latching portion;

performing the interrupts in the interrupt database according to the determined priority order; and performing an interrupt received having no associated priority level.

9. A method according to claim 8, further comprising outputting latched signals from the D-flip flops of the latching loops an output OR gate.

* * * * *